United States Patent [19]

Phillips

[11] 4,178,675

[45] Dec. 18, 1979

[54] APPLICATOR FOR TELEPHONE CONNECTORS

[75] Inventor: Howard C. Phillips, Harrisburg, Pa.

[73] Assignee: AMP Incorporated, Harrisburg, Pa.

[21] Appl. No.: 895,556

[22] Filed: Apr. 12, 1978

[51] Int. Cl.$^2$ .............................................. B23P 23/00

[52] U.S. Cl. ....................................... 29/566.1; 29/753; 29/759

[58] Field of Search ..................... 29/566, 629, 630 A, 29/566.1, 564.1, 564.6, 564.5, 751, 753, 566.2, 566.3, 759

[56] References Cited

U.S. PATENT DOCUMENTS

| | | | |
|---|---|---|---|
| 3,628,228 | 12/1971 | van de Kerkhof | 29/759 |
| 3,668,764 | 6/1972 | Randar | 29/628 |
| 3,860,316 | 1/1975 | Hardesty | 339/91 R |
| 3,911,717 | 10/1975 | Yuda | 29/630 A |
| 4,031,613 | 6/1977 | Brown et al. | 29/628 |
| 4,040,180 | 8/1977 | Brown | 29/759 X |

FOREIGN PATENT DOCUMENTS

| | | | |
|---|---|---|---|
| 1465187 | 2/1969 | Fed. Rep. of Germany | 29/630 |

*Primary Examiner*—William R. Briggs

*Attorney, Agent, or Firm*—Frederick W. Raring

[57] ABSTRACT

Apparatus for installing connectors on the ends of cables comprises first and second reciprocable rams which are coupled to each other by compressible coupling means. Connector deforming tools are mounted on the first ram which inwardly deform portions of the connector thereby to clamp the connector to the cable. Contact insertion tool means are mounted on the second ram and function to push contact members through the connector housing and into the wires of the cable. The arrangement is such that the deforming tools dwell in their lowered position and support the connector housing while the insertion tools drive the contact members through the housing. This arrangement prevents unwanted deformation of the housing while the contact members are being driven therethrough. The apparatus is also provided with improved aligning means which functions to align the connector with the deforming tools and the insertion tools.

6 Claims, 9 Drawing Figures

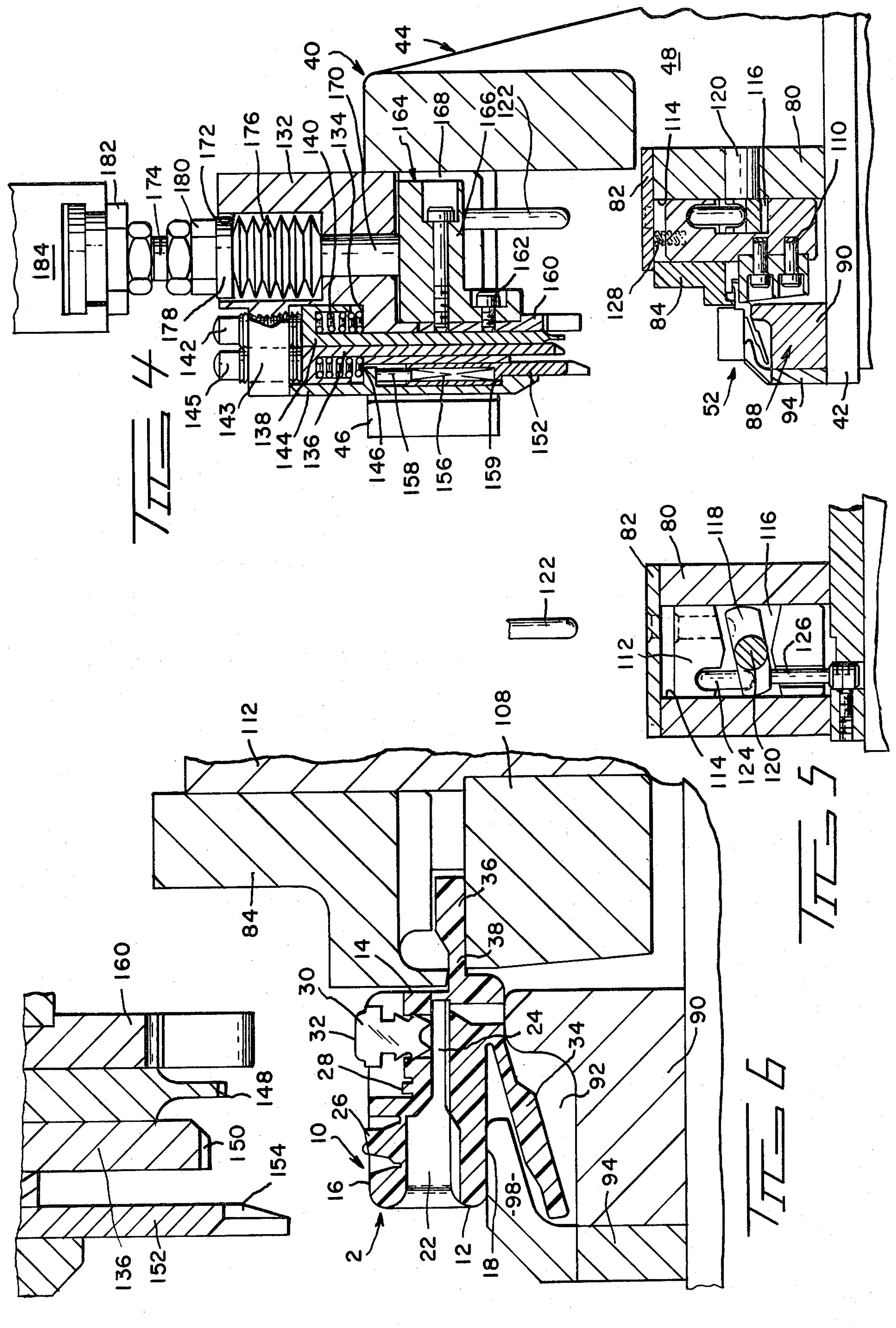

APPLICATOR FOR TELEPHONE CONNECTORS

BACKGROUND OF THE INVENTION

This invention relates to applicators for installing connectors onto the ends of cables, the connectors being of the type which are being widely adopted in the telephone industry.

U.S. Pat. No. 3,998,514 discloses an electrical connector which is adapted to be mounted on the end of a cable containing a limited number of conductors, four or six, and which is dimensioned to be mated with a complementary receptacle to connect the conductors of the cable with terminals in a receptacle. Connectors of the type described in the above identified patent are coming into common usage in the telephone industry and it is foreseen that they will be used in vast numbers.

While the general principles of these "Modular Telephone Connectors" are standard, there are minor differences between closely related types of connectors being used. For example, some connectors are being produced as two-piece items which are assembled to each other when the connector is installed on the cable. Others are being produced with one-piece connector housings, however, all are being produced as loose-piece items rather than in strip form.

Connectors of the type described in the above identified patent comprise a housing having a cable-receiving cavity which receives an end of the cable on which the connector is being installed. Upon installation, portions of the top wall of the connector housing are inwardly deformed so that they clamp portions of the cable and provide a strain relief and a mechanical coupling between the connector and the cable. The electrical contacts are driven through the connector housing and pierce conductors of the cable to establish the electrical contacts. Portions of these electrical contact members project beyond one surface of the housing and are contacted by contact members in a receptacle into which the connector is inserted.

It is common practice at present to install connectors, of the type described above, on the ends of cables by inserting the cable end into the connector and first inwardly deforming the housing to clamp the housing to the cable. The connector with the cable clamped thereto is then moved to a second insertion station and the contact members are driven through the connector housings and into electrical contact with the conductors. This assembly method, requiring as it does, two separate operations is relatively slow and inefficient. Furthermore, and as noted above, these telephone connectors are being manufactured as loose-piece items, a circumstance which further restricts the production rates which can be achieved in installing connectors on cables.

The instant invention is directed to the achievement of an applicator which is capable of installing connectors in strip form on the ends of cables and which additionally is capable of carrying out all of the required operations (deformation of the connector housing onto an inserted cable, insertion of the contact members into the housing, and severing of the connector from the strip) in a single operation and during the single stroke of a bench press or the like.

In accordance with the principles of the invention, the applicator has first and second rams which are coupled to each other by a compressible coupling means. The tooling for inwardly deforming the connector housing is mounted on the first ram and the insertion tooling for driving the contact members into the housing is mounted on the second ram. The arrangement is such that the two rams initially move in unison towards a connector disposed in the application zone of the apparatus and the deforming tool first inwardly deforms the connector housing so that the housing clamps the cable. Thereafter, the first ram dwells and the second ram continues to move towards the connector with accompanying compression of the coupling means to drive the contact members into engagement with the conductors in the cable. The applicator is also provided with feeding means for feeding a strip of connectors to the application zone, and severing means which severs the leading connector of this strip from the carrier strip at the time of installation.

The two rams also have mounted thereon aligning means which align the connector precisely with the applicator tooling prior to deformation of the housing and insertion of the contact members.

It is accordingly an object of the invention to provide an improved applicator for installing connectors in strip form on the ends of cables. A further object is to provide an applicator having improved strip feeding means and aligning means for aligning the leading connector of a strip with the tooling of the applicator which installs the connector on the cable. A further object is to provide an applicator having improved ram means on which connector deforming and contact insertion tooling is provided, the arrangement of the rams being such that the connector is first mechanically clamped to a cable and the contact members are thereafter driven through the connector to establish electrical contact with the connectors of the cable.

These and other objects of the invention are achieved in a preferred embodiment in the foregoing abstract, which is described in detail below and which is shown in the accompanying drawings in which:

FIG. 4 is a sectional side view of the applicator of FIG. 3 taken along the lines 4—4 of FIG. 3.

FIG. 5 is a fragmentary view taken along the lines 5—5 of FIG. 4.

FIG. 6 is an enlarged sectional side view of the application zone of the applicator showing the positions of the parts after a connector has been fed to the application zone but prior to insertion of a cable into the connector.

Figure 1:
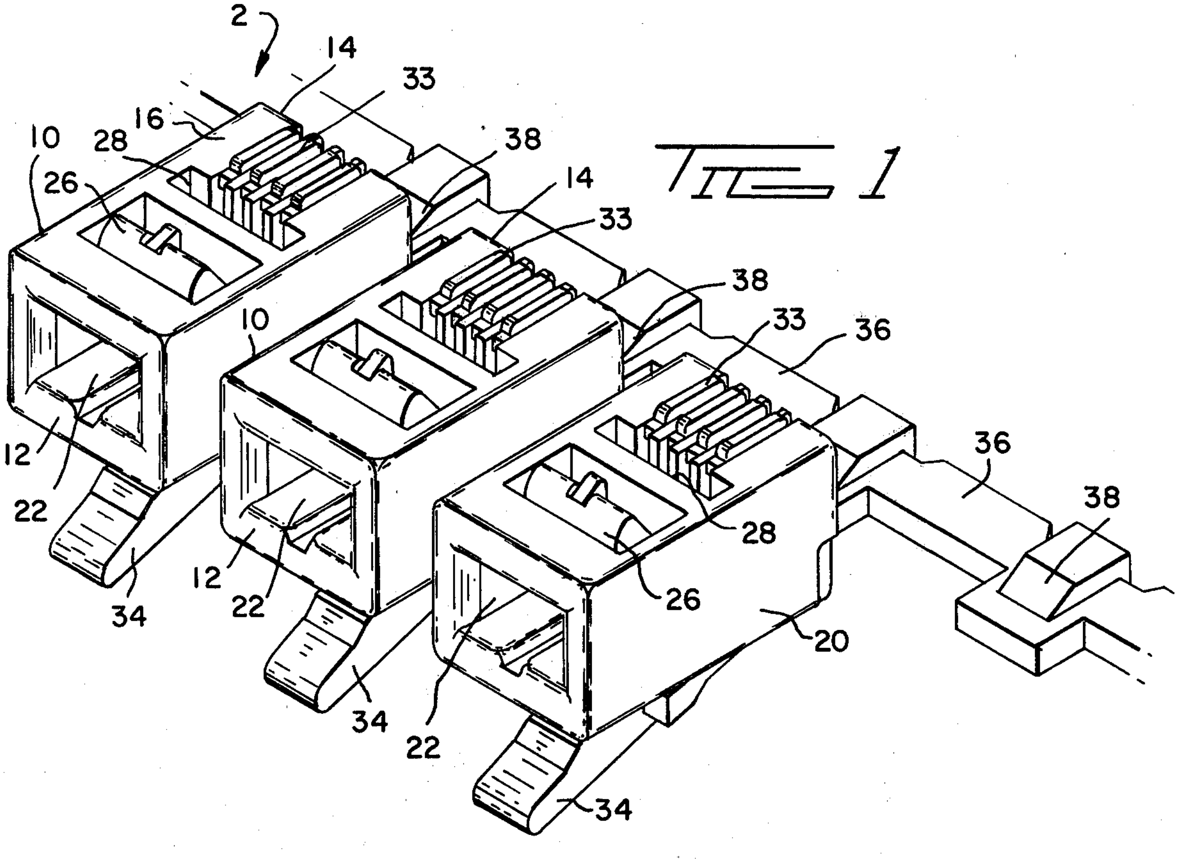
FIG. 1 is a perspective view of a section of endless strip of connectors.
Figure 2:
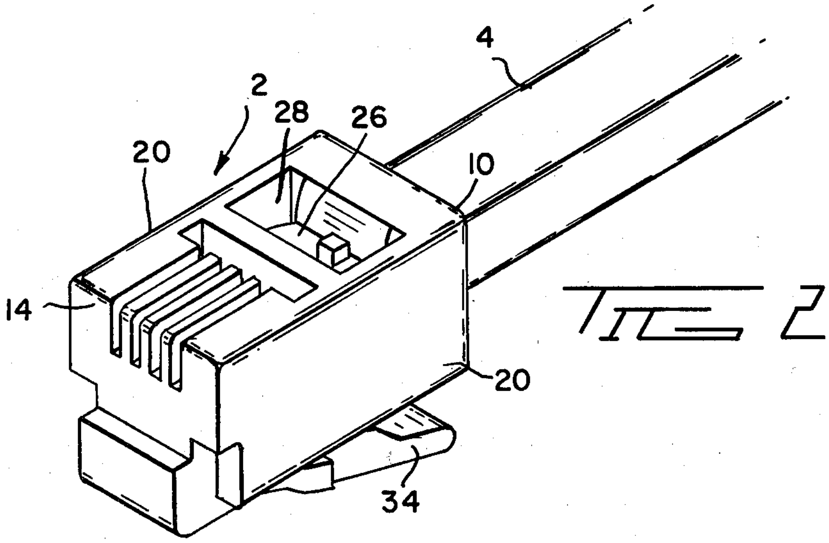
FIG. 2 is a perspective view showing an individual connector installed on the end of a cable.

Referring first to FIGS. 1 and 2, connector 2 of the type coming into widespread usage in the telephone industry is intended to be installed on one end of cable 4 which comprises a plurality of side-by-side conductors 8 which are contained within a cable sheath 6. When a connector is installed on the end of a cable, a portion of the sheath 6 is removed to expose the conductors 8, although the insulation of the conductors is not stripped therefrom.

Figure 8:
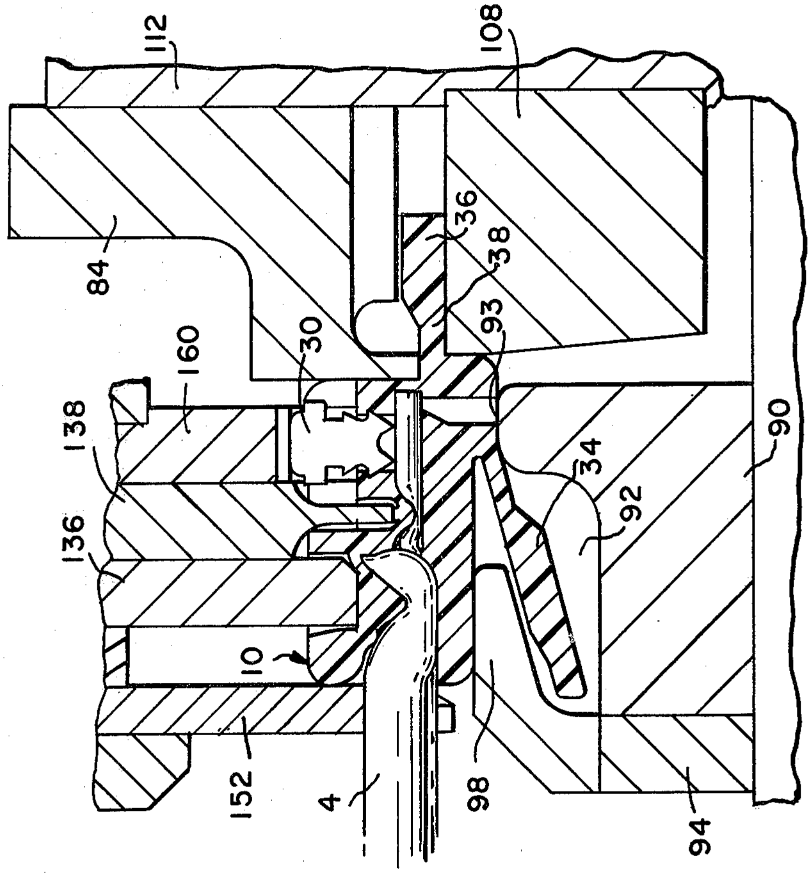
FIGS. 7 and 8 are views similar to FIG. 6 but showing successive stages in the installation of the connector on the end of the cable, FIG. 7 showing the positions of the parts after the aligning means has aligned the connector with the tooling and FIG. 8 showing the positions of the parts after the deforming tooling has penetrated the connector housing and clamped the housing to the cable.

The connector 2 comprises a generally rectangular housing 10 of insulating material, usually polycarbonate, having a cable-receiving end 12, a mating end 14, a top wall 16, a bottom wall 18, and parallel sidewalls 20. A cable-receiving cavity 22 extends inwardly from the cable-receiving end towards the mating end 14 and has a reduced portion 24 adjacent to the mating end which receives only the conductors 8, the sheath portion 6 of the cable being received in the enlarged section of the cavity adjacent to the end 12. The top wall is provided with primary and secondary strain relief portions 26, 28 which are shaped as shown and which are intended to be inwardly deformed as shown in FIG. 8 so that the covering sheath 6 and the individual conductors 8 are clamped by the housing to provide a secure mechanical connection. These strain relief features are essentially as described in the above-identified U.S. Pat. No. 3,954,320 and in other patents assigned to the Western Electric Company.

Electrical contact is established with the individual conductors 4 by means of flat contact members 30 which are partially inserted through undersized openings extending into the top wall 16 adjacent to the mating end 14. These openings are separated by barriers 33 so that after the contacts are fully inserted, the upper edges 32 of the contacts will be exposed but the edges of adjacent contacts will be separated from each other by the barrier walls. These edges 32 are engaged by contact spring members in a mating receptacle with which the connector 2 is mated.

The preferred embodiment of the apparatus in accordance with the instant invention is intended to install connectors in the form of a continuous strip on the ends of cables, the strip comprising an endless carrier strip 36 from which the connectors 2 extend at spaced apart intervals, each connector being joined to the carrier strip by an integral connecting section 38 which is removed when the individual connectors are installed on a cable.

Figure 3:
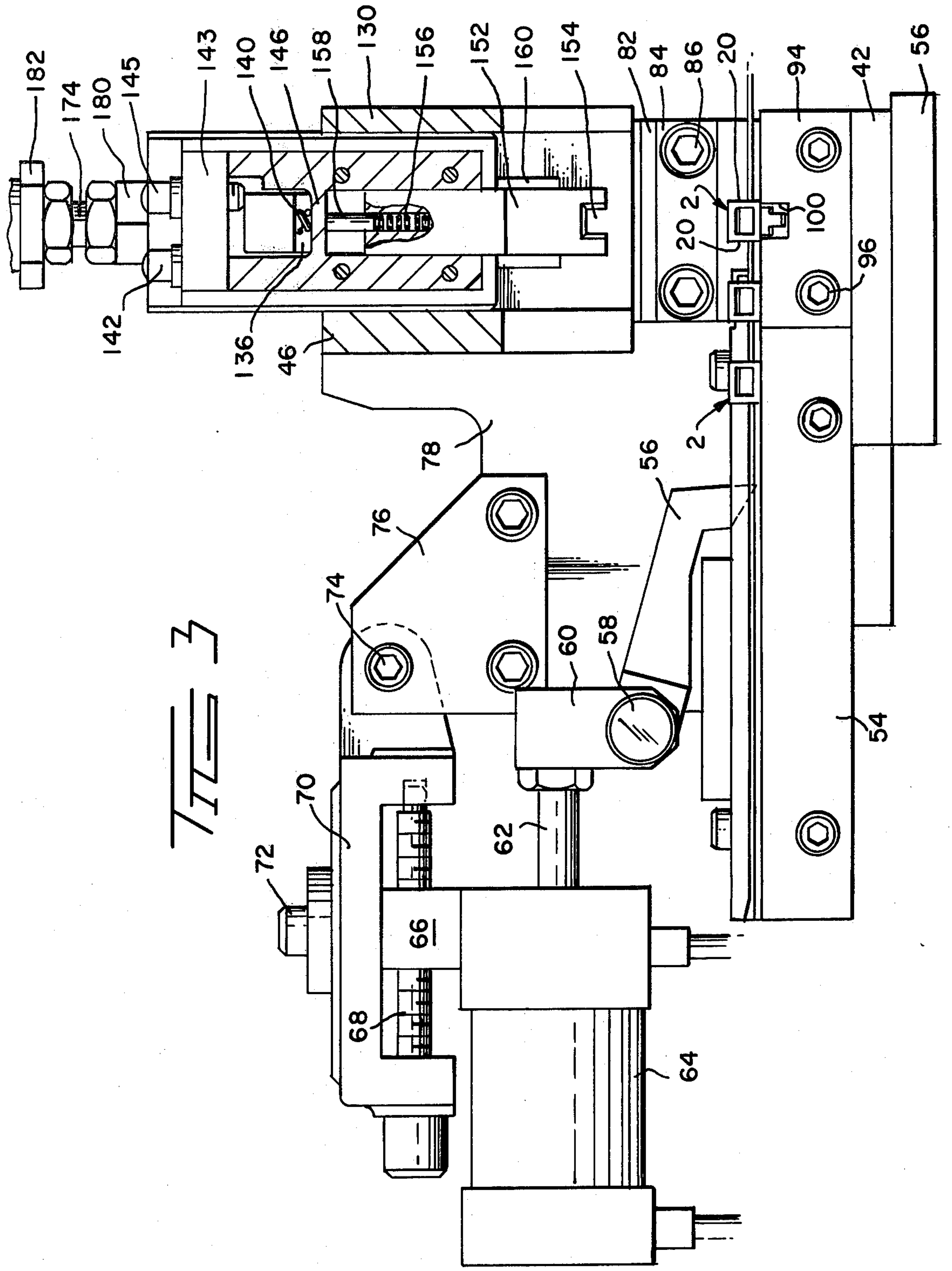
FIG. 3 is a frontal view of an applicator in accordance with the invention.

Referring now to FIGS. 3-5, a connector applicator 40, in accordance with the invention, comprises C-shaped frame means having a base 42, an upper arm 46, and neck portion 48. The base is mounted on the platen 50 of a suitable press, the ram of which is coupled to the second ram 166 of the applicator as will be described below. The vicinity above the base 42, as viewed in FIG. 4, constitutes an application zone 52 in which the connector 2 being installed is supported during application of the connector to the cable.

The strip of connectors is fed to the application zone 52 over a leftwardly extending feed platform 54, as viewed in FIG. 3. The upper surface of this platform has a suitable feed track which serves to guide the connector strip from a source, such as a reel, to the application zone 52. The strip is intermittently fed during each operating cycle by a reciprocable feed finger 56 which is pivotably connected at 58 to a yoke 60 on the end of a piston rod 62, a suitable torsion spring means, not specifically shown, being provided at the pivotal connection 58 reliantly to bias the finger 56 in a clockwise direction. The piston rod 62 extends from a pneumatic piston cylinder 64 which is supplied with compressed air by air lines as shown. This piston cylinder is suspended by means of a mounting bracket 66 from a mounting screw 68 which is rotatably, and non-movably supported, in a support bracket 70. It will be apparent that rotation of the screw 68 permits rightward and leftward movement of the piston cylinder 64 in order to permit adjustment of the stroke limits of the feed finger. The piston cylinder is clamped to the bracket 70 by means of a clamping screw 72 which is threaded through the bracket 70 and into the support bracket 66.

Bracket 70 is secured by means of a fastener 74 to a plate 76 which in turn is secured by fasteners to a plate 78 which extends leftwardly from, and is integral with, the neck portion of the applicator frame.

A mounting block 80 is fixed on the plate 42 in the application zone and a cover plate 82 is secured to the upper surface of this mounting block. A fixed shear block 84 is also secured to the block 80 on the front face thereof by fasteners as shown at 86, FIG. 3. A fixed anvil assembly 88, which is integral with feed platform 88, is mounted on the plate 42 in front of, and below the shear block 84 and comprises an anvil block 90 having a recess 92 in its upper surface to provide clearance for the latch arm 34 of the connector, the underside of the connector adjacent to the mating end 14 being supported on a raised surface portion 93 of the block 90. The anvil assembly further comprises an anvil plate 94 secured to the face of the block 90 by fasteners 96, see FIG. 3. This anvil plate has an inwardly projecting lip 98 which extends partially over the recess 92 and which supports the lower surface of the connector adjacent to the cable-receiving end 12 thereof. An opening 100 is provided in the anvil plate 94 to permit removal of the connector from the application zone after it has been installed on a cable end.

Figure 9:
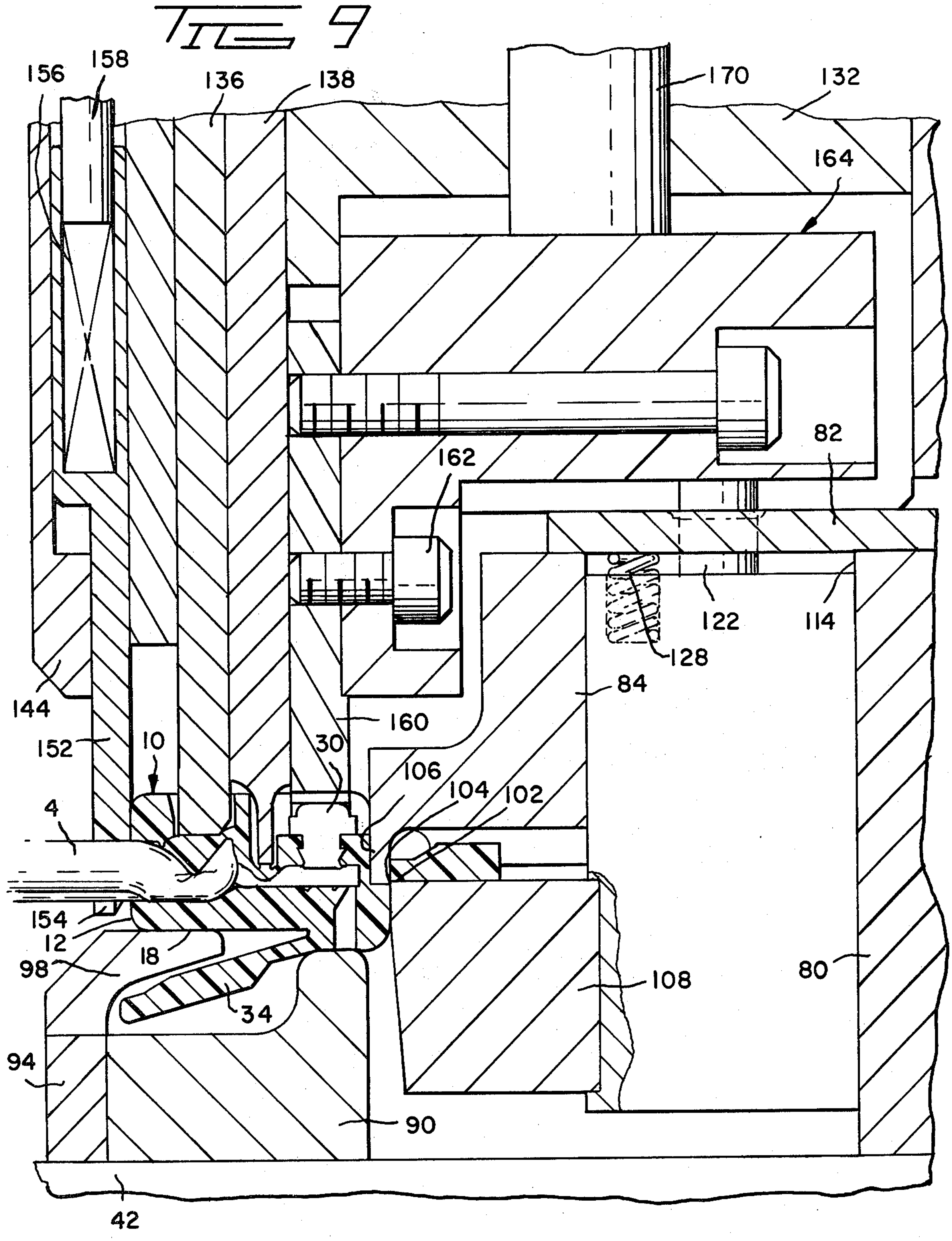
FIG. 9 is a view similar to FIGS. 6–8 showing the positions of the parts at the conclusion of the process, this view was illustrating the relative movement of the second ram with respect to the first ram.

The leading connector of the strip which is located in the application zone 52 is severed from the strip at the conclusion of the installation process by fixed and movable shearing edges 104, 102, best shown in FIG. 9, which move relatively past each other. The fixed shearing edge 104 is provided by the lower edge of a depending lip 106 which extends downwardly from the previously idetified shear block 84. The movble shearing edge 102 is provided by an edge of an upwardly movable (as viewed in FIG. 8) block 108 which is secured by fasteners 110 to a slide block 112. This slide block is contained in a vertically extending slot 114 in the mounting block 80, the recess being covered by the cover plate 82 as shown in FIG. 5. A central recess 116, also shown in FIG. 5, is provided in the slide block 112 and an actuator lever 118 is located in this central recess. Lever 118 is fixed to the end of a stub shaft 120 which is journaled in the tooling block 80, as shown in FIG. 4. The actuator arm 118 is swung through a clockwise arc when the shearing mechanism is actuated by a rod 122 which extends downwardly from a second arm means 166 which is described below. The rod 122 passes through aligned openings in the plate 82 and in the slide block 112 and engages the right hand end, as viewed in FIG. 5, of the lever 118. As the result, the left hand end of this lever moves upwardly against a loosely contained pin 124 which is confined in recesses in the slide 112 and the lever 118. The pin 124 thus pushes the slide block 112 upwardly and causes the movable shearing edge 102 to move past the fixed shearing edge and shear the connector from the strip, as shown in FIG. 9. A suitable spring, as shown at 128, is provided between the cover plate 82 and the slide block 112 to bias the slide block downwardly, the downward motion being limited by a stop screw 126 which is engaged by the left hand end of the lever 118.

The upper arm 46 of the applicator frame is covered by removable side cover plate 130, FIG. 3, and an applicator ram generally indicated at 132 is slidably mounted in the opening defined by a recess in this upper arm and the cover plate, suitable guides being provided to ensure straight line movement of the ram towards and away from the application zone 52. The ram 132 has a recess on its leftwardly facing side, as shown at 134 in FIG. 4, and this recess defines an upwardly facing ledge. Primary and secondary strain relief deforming tools 136, 138 are adjustably mounted against the left hand side of the ram 132 for movement with the ram towards the application zone. The upper ends of these deforming tools 136, 138 are enlarged, as shown in FIG. 4, and are provided with downwardly facing recesses. The deforming tool 138 can be adjusted by means of an adjusting screw 142 which is threaded through an extension 143 of the ram 132 and bears against the upper end of the deforming tool 138. A spring 140 is contained in the recess in the upper end of the tool and bears against the ledge 134 so that the tool is biased upwardly against the lower end of the adjusting screw 142.

The deforming tool 136 is disposed against the tool 138 and is retained in position by a cover plate 144 which is secured to the front face of the ram 132. The tool 136 can be adjusted by means of a screw 145 which also bears against the upper end of the deforming tool and a spring similar to the spring 140 extends into a recess of the upper arm of the tool 136. This spring bears at its lower end against an inwardly directed ledge 146 extending from the cover plate 144. This cover plate also acts as a retainer for an aligning plate 152, as described below.

Figure 7:
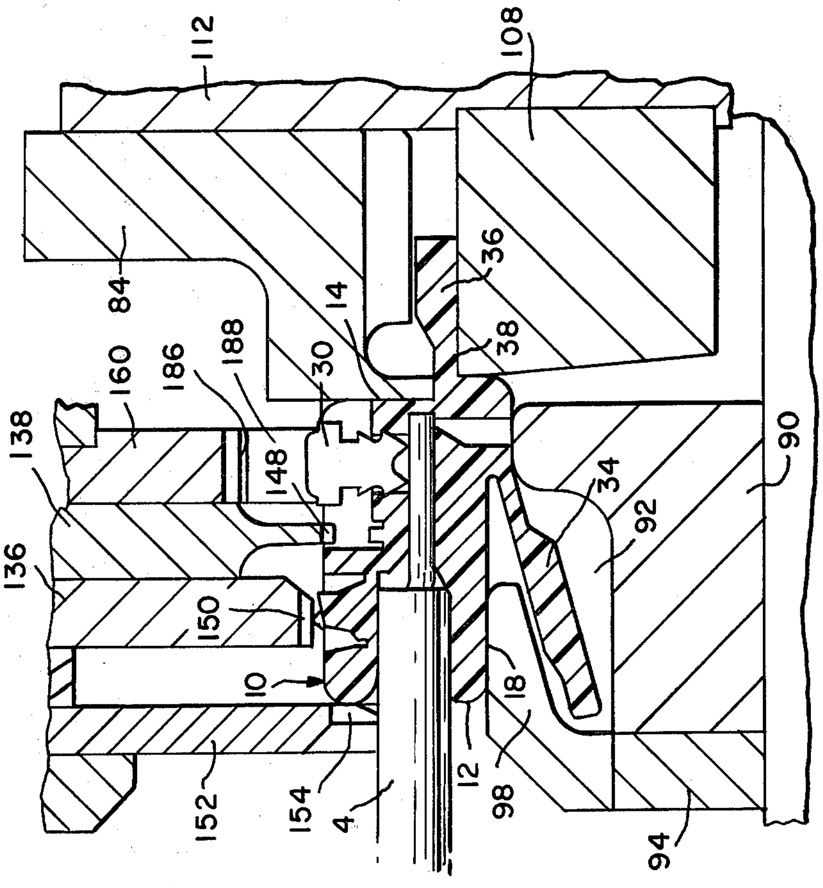

The lower ends 148, 150 of the deforming tools 136, 138 are contoured such that they indent the two strain relief portions 26, 28 in the top wall 16 of the connector as illustrated in FIGS. 7 and 8. In general, the principles of these strain relief portions are in accordance with the teachings of the above identified U.S. Pat. No. 3,998,514. As will be explained below, these deforming tools move downwardly and deform the strain relief portions of the connector prior to insertion of the contact members into the conductors of the connector.

It is desirable to ensure precise alignment of the connector 2, which is in the application zone 52, with the deforming tools and the contact inserting tool described below prior to arrival of the lower ends 148, 150 of the deforming tools at the application zone. In the disclosed embodiment, the leading connector 2 is first aligned in an endwise sense by an aligning plate 152 which moves across portions of the surface of the connector housing adjacent to the cable-receiving end 12 and urges the connector rightwardly, as shown in FIGS. 6 and 7, until the mating end 14 is against the leftwardly facing surface of the lip 106 of shear block 84. The leading connector is then aligned in a sidewise sense by spaced apart depending legs 188 which are integral with the inserting tool 160 described below.

The aligning plate 152 projects downwardly beyond the lower ends 148, 150 of the deforming tools 136, 138 and has surface portions 154 which cam the connector rightwardly, as shown in FIGS. 6 and 7. This aligning plate also has a central opening 155 to provide clearance for the cable. The aligning plate 152 dwells in its lowermost position for a significant interval while the other tools are moved downwardly with the ram. This dwell is accomplished by virtue of the fact that the aligning plate is slidably mounted between a spacer plate and the internal surface of the cover plate 144. A recess 156 is provided in the enlarged upper end of the aligning plate and a spring contained in the recess bears against the lower end of cylindrical rod 158 which in turn bears against the downwardly facing surface of the previously identified ledge 146 of the cover plate 144. Downward motion of the aligning plate 152 beyond the position shown in FIG. 4 is prevented by interengaging shoulder means 159 of the aligning plate and the cover plate 144. It will thus be apparent that as the tooling moves downwardly past the position of FIG. 7 the aligning plate is permitted to dwell in the position shown in FIG. 8 with accompanying compression of the spring in the recess 156.

It will be apparent from the foregoing description that the deforming tools 136, 138 move with the applicator ram or first ram 132. The contact member inserting tool 160, however, is mounted on a second ram 164 by means of fasteners 162. This second ram is capable of limited overtravel relative to the first ram after the first ram has reached its lowermost position. The second ram 164 comprises a block 166 which is slidably mounted in a recess 168 in the lower end of the block 132 of the first ram. An integral rod 170 extends upwardly from the block 166 through an opening in the block 132. This opening is enlarged, or counterbored as shown at 172, at its upper end. The upper portion of the rod 170 is threaded, as shown at 174, and a plurality of stiffly compressed conical washers 176 (Belleville washers) are provided on the rod 170 in the enlarged upper portion of opening 172. The washers 176 are captured between the inner end of the recess 172 and a flat washer 178 on the rod 170 which is retained in position by suitable lock nuts as shown at 180.

The upper end of the rod 170 has a coupling member 182 thereon by means of which it is coupled to the ram 184 of a bench press or the like.

The insertion tool 160 has a plurality of parallel spaced-apart inserters 186 on its lower end which are dimensioned to engage the upper edges 32 of the contact members and push them downwardly into the connector housing, as shown in FIGS. 8 and 9 until they penetrate the individual conductors of the cable and establish electrical contact with the conducting cores of these conductors. The inserters are dimensioned such that they do not disturb or damage the ribs on the upper surface of the connector housing.

As previously mentioned, sidewise alignment of the leading connector 2 is accomplished by means of spaced-apart aligning legs 188 which depend from the lower end of the insertion tool and which are contoured and dimensioned such that they engage sidewalls of the connector and move it sidewise by a slight amount so that the contact members 20 will be in precise alignment with the indentor projections 186.

It will be understood that the applicator shown is intended for mounting in a conventional bench press or in a semi-automatic machine having cable feeding means and incorporating a press which would be coupled to the applicator. The applicator is mounted on a bench press and the cable is manually positioned in the leading connector, the operation is as follows.

The operator first inserts the end portion of a cable into the cable-receiving cavity of the connector which was fed during the previous operating cycle to the application zone 52. The operator thereafter closes a suitable foot switch which controls the bench press on which the applitor is mounted. Closing of this switch causes engagement of a single revolution clutch so that the press ram moves downwardly to its bottom dead-center position and then returns to its raised position. During downward movement of the press ram, the first and second rams of the applicator move downwardly in unison and the connector 2 is first aligned with the tooling in an endwise sense by the aligning plate 152, see FIGS. 7 and 8. Thereafter, the aligning plate dwells, the spring 156 is compressed, and the first and second rams move downwardly until the deforming tools 136, 138 inwardly deform the portions 26, 28 of the connector. At this stage, the cable and the conductors of the cable will be firmly held by the deformed portions of the connector housing and the deforming tools will dwell in the position of FIG. 8. The first ram is brought to an abrupt and definite position by stop means which is effective between the top plate 82 and the ram block 32 so that the deforming tools 136, 138 will not move downwardly beyond the positions shown in FIG. 8.

During the final portion of the downward stroke of the press plate, the second ram 164 moves downwardly with accompanying compression of the spring washers 176 as illustrated in FIG. 9. In FIG. 9, the gap between the upper surface of the block 166 of the second ram and the surface of the block 132 of the first ram is exaggerated for purposes of illustration. It will be understood that the relative movement of the second ram is only the amount required to drive the contact members downwardly from the position of FIG. 8 to the position on FIG. 9.

What is claimed is:

1. Apparatus for installing a connector on a cable, said connector comprising an insulating housing having a mating end and a cable-receiving end, said ends being oppositely directed, said housing having a top wall, a bottom wall, and sidewalls extending between said ends, a cable-receiving cavity extending into said cable-receiving end towards said mating end, a plurality of side-by-side contact members partially inserted into said top wall adjacent to said mating end, and inwardly deformable strain-relief portions in said top wall adjacent to said contact members, said connector extending from a continuous strip of identical connectors, said strip comprising a carrier strip having said connectors extending laterally from said carrier strip at spaced apart intervals, said apparatus comprising:

frame means, a connector application zone and a first ram in said frame means, said ram being reciprocable towards and away from said application zone, strip feeding means for feeding said strip towards said application zone thereby to position the leading connector of said strip in said zone, deforming tool means on said first ram, said deforming tool means being engageable with said deformable strain-relief portions of a connector in said application zone upon movement of said first ram from a retracted position towards said application zone, stop means effective between said frame means and said first ram, said stop means being effective to stop motion of said first ram after inward deformation of said strain relief portions of said connector, a second ram which is reciprocable towards and away from said application zone, contact insertion tool means on said second ram, said contact insertion tool means being engageable with said contact members upon movement of said second ram towards said application zone thereby to drive said contact members into said housing, compressible coupling means serving to couple said second ram to said first ram whereby, upon positioning a connector in said application zone, inserting a cable into said cable-receiving cavity and upon movement of said second ram towards said application zone, said first and second rams initially move towards said zone and said strain-relief portions of said connector are inwardly deformed whereby said cable is clamped in said cavity and said first ram is stopped from movement by said stop, and said second ram continues to move towards said application zone with accompanying compression of said coupling means, and said contact members are driven into said housing and into electrical contact with the conductors of said cable and, a connector aligning means for precisely aligning said leading connector of said strip so that said strain-relief portions and said contact members are positioned in alignment with said deforming tool means and said contact insertion tool means respectively, said connector aligning means comprising a primary aligning tool and a secondary aligning tool, said primary aligning tool being engageable with portions of said connector adjacent to said cable-receiving end and being effective to align said connector in an endwise sense, said secondary aligning tool being engageable with said sidewalls of said housing and beging effective to align said connector in a sidewise sense.

2. Apparatus as set forth in claim 1, said secondary aligning tool comprising spaced-apart aligning members extending from said contact insertion tool means, said aligning members being dimensioned to receive said connector housing therebetween and align said connector in a sidewise sense.

3. Apparatus as set forth in claim 2, said primary aligning tool comprising an aligning plate, said plate being slidably mounted on said first ram for movement parallel to the direction of movement of said rams, and spring means interposed between said first ram and said aligning plate, said spring means serving to bias said aligning plate to an extended position and permitting overtravel of said first ram relative to said aligning plate after engagement of said plate with said connector.

4. Apparatus for installing connectors on cables, said connectors being in the form of a continuous strip comprising a carrier strip with said connectors extending from said carrier strip at spaced-apart intervals, each of said connectors comprising an insulating housing having a mating end and a cable-receiving end, said ends being oppositely directed, each of said housings having a top wall, a bottom wall, and sidewalls extending between said ends, a cable-receiving cavity extending into said cable-receiving end towards said mating end, a plurality of side-by-side contact members partially inserted into said top wall adjacent to said mating end, and inwardly deformable cable strain relief portions in said top wall, said strain relief portions being between said contact members and said cable receiving end, said apparatus comprising:

a connector application zone, strip feeding means for feeding a strip of said connectors to said application zone thereby to position the leading connector of said strip at said application zone, a ram reciprocably mounted for movement towards and away from said application zone, said ram having mounted thereon a contact insertion tool means, strain relief deforming tool means, and connector aligning means, said connector aligning means comprising a primary aligning tool and a secondary aligning tool, said primary and secondary aligning tools having aligning surface portions which project towards said application zone beyond the extent of projection of said insertion tool means and said deforming tool means, said primary aligning tool being engageable with portions of said connector adjacent to said cable-receiving end and being effective to align said connector in an endwise sense, said secondary aligning tool being engageable with said sidewalls of said housing and being effective to align said connector in a sidewise sense whereby, upon actuation of said feeding means insertion of a cable into said cable-receiving cavity, and movement of said ram towards said application zone, said connector is precisely positioned at said application zone, said strain-relief portions of said top wall are inwardly deformed onto said cable, and said contact members are fully inserted through said top wall and are electrically connected to the conductors of said cable.

5. Apparatus as set forth in claim 4, said secondary aligning tool comprising spaced-apart aligning members extending from said insertion tool means, said aligning members being dimensioned to receive said connector therebetween and align said connector in a sidewise sense.

6. Apparatus as set forth in claim 5, said primary aligning tool comprising an aligning plate, said plate being slidably mounted on said ram for movement parallel to the direction of movement of said ram, and spring means interposed between said ram and said aligning plate, said spring means serving to bias said aligning plate to an extended position and permitting overtravel of said ram relative to said aligning plate after engagement of said plate with said connector.

* * * * *